(12) United States Patent
Cho et al.

(10) Patent No.: US 12,194,890 B2
(45) Date of Patent: Jan. 14, 2025

(54) ELECTRIFIED VEHICLE AND METHOD OF CONTROLLING DRIVING OF SAME

(71) Applicants: Hyundai Motor Company, Seoul (KR); Kia Corporation, Seoul (KR)

(72) Inventors: Jin Kyeom Cho, Gyeonggi-do (KR); Jun Yong Park, Gyeonggi-do (KR); Sung Deok Kim, Gyeonggi-do (KR); Sun Young Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 242 days.

(21) Appl. No.: 17/986,166

(22) Filed: Nov. 14, 2022

(65) Prior Publication Data

US 2023/0373312 A1 Nov. 23, 2023

(30) Foreign Application Priority Data

May 18, 2022 (KR) .................. 10-2022-0060955

(51) Int. Cl.
*B60L 15/20* (2006.01)
*B60L 7/18* (2006.01)
*B60Q 5/00* (2006.01)

(52) U.S. Cl.
CPC ............. *B60L 7/18* (2013.01); *B60L 15/2009* (2013.01); *B60Q 5/008* (2013.01); *B60L 2240/12* (2013.01); *B60L 2240/48* (2013.01); *B60L 2240/60* (2013.01)

(58) Field of Classification Search
CPC ......... B60W 60/0015; B60W 2554/20; B60W 2554/402; B60W 2556/00
See application file for complete search history.

(56) References Cited

FOREIGN PATENT DOCUMENTS

| KR | 10-2015-0001546 A | 1/2015 |
|---|---|---|
| KR | 10-2019-0080061 A | 7/2019 |
| KR | 10-2019-0128853 A | 11/2019 |

*Primary Examiner* — Mathew Franklin Gordon
(74) *Attorney, Agent, or Firm* — Fox Rothschild LLP

(57) ABSTRACT

Proposed is an apparatus, software program, and a corresponding method of controlling driving of an electrified vehicle. The method includes increasing a level of regenerative braking on the basis of a remaining distance from the vehicle to a stop-event point when a brake control mode is entered, determining whether or not braking needs to be performed, on the basis of a stop approval signal when the remaining distance is equal to or less than a preset first distance in the brake control mode, and decreasing the level of regenerative braking when a distance of traveling of the vehicle from the stop-event point is equal or greater than a preset second distance in the brake control mode.

20 Claims, 5 Drawing Sheets

ELECTRIFIED VEHICLE AND METHOD OF CONTROLLING DRIVING OF SAME

CROSS-REFERENCE TO RELATED APPLICATION

The present application claims under 35 U.S.C. § 119(a) priority to and the benefit of Korean patent Application No. 10-2022-0060955, filed on May 18, 2022, the entire contents of which is incorporated herein for all purposes by this reference.

BACKGROUND

1. Technical Field

The present disclosure relates to an electrified vehicle that is capable of controlling a level of regenerative braking and whether or not hydraulic braking needs to intervene, in a situation where the vehicle needs to come to a stop and to restart, and relates to a method of controlling driving of the electrified vehicle.

2. Background

With growing concern about the environment, there is a trend toward growing demand for environment-friendly vehicles, each having an electric motor as a motive power source. The environment-friendly vehicle is also referred to as an electrified vehicle. Typical examples of the environment-friendly vehicle include a hybrid electric vehicle (HEV), a plug-in hybrid electric vehicle (PHEV), an electric vehicle (EV), a fuel cell electric vehicle (FCEV) and the like.

Examples of a technique of braking the electrified vehicle include a hydraulic braking technique that uses hydraulic braking, a regenerative braking technique that uses a drive motor, and the like. The regenerative braking refers to deceleration of a vehicle that results from an electric motor charging a battery using kinetic energy of a wheel.

In the electrified vehicle, a level of regenerative braking can be set in such a manner as to adjust an amount of regenerative braking of the electric motor in a stepwise manner. The level of regenerative braking is attached to a steering wheel, and can vary through operation of a paddle shift that manually adjusts a gear-shift step. Accordingly, a driver can vary the level of regenerative braking through the operation of the paddle shift in a situation where the vehicle needs to come to a stop and to restart and thus can control a vehicle speed.

However, the use of this method requires the paddle shift to be mounted in the electrified vehicle to vary the level of regenerative braking and requires the driver to operate a steering wheel, a brake pedal, and an acceleration pedal, as well as the paddle shift, in a situation the vehicle needs to come to a stop and then to restart, thereby increasing complexity of the driver's operation. This complexity makes it difficult for the driver to keep driving safely when a red light of a traffic light flickers and when making a right, thereby leading to a traffic accident.

The foregoing is intended merely to aid in understanding the background of the present disclosure and therefore should not be interpreted to admit that the present disclosure falls within the purview of the related art that is already known to a person of ordinary skill in the art.

SUMMARY

An objective of the present disclosure is to control a level of regenerative braking, whether or not braking, for example hydraulic braking, needs to intervene and/or be performed, and the like, without operating a paddle shift in a situation where a vehicle needs to come to a stop and to restart, and thus to improve the operational convenience and safety of a driver.

The present disclosure is not limited to the above-mentioned objective. From the following description, an objective not mentioned would be clearly understandable by a person of ordinary skill in the art to which the present disclosure pertains.

According to an aspect of the present disclosure, there is provided a method of controlling driving of an electrified vehicle, the method including: raising a level of regenerative braking on the basis of a remaining distance measured from a vehicle to a stop-event point when a brake control mode is entered; determining whether or not to perform braking on the basis of a stop approval signal when the remaining distance is equal to or less than a preset first distance in the brake control mode; and decreasing the level of regenerative braking when a distance of traveling of the vehicle measured from the stop-event point is equal to or greater than a preset second distance in the brake control mode.

According to another aspect of the present disclosure, there is provided an apparatus for use with an electrified vehicle. The apparatus including: a control mode determination unit configured to determine whether or not a brake control mode will be entered on the basis of a remaining distance from the vehicle to a stop-event point. The control mode determination unit may be further configured to determine to enter stop control when the remaining distance is equal to or less than a preset first distance in the brake control mode, and the apparatus may include a brake control determination unit configured to: raise a level of regenerative braking when the brake control mode is entered, and to determine whether or not braking needs to be performed, on the basis of a stop approval signal when the stop control is performed, and to decrease the level of regenerative braking when a distance of traveling of the vehicle from the stop-event point is equal to or greater than a preset second distance. In various embodiments, the braking may be a hydraulic braking and/or an engine braking.

According to the present disclosure, the level of regenerative braking, whether or not the hydraulic braking needs to intervene, and the like can be controlled without operating the paddle shift in the situation where the vehicle needs to come to a stop and to restart, and thus the operational convenience and safety of a driver can be improved.

The present disclosure is not limited to the advantageous effect mentioned above. From the following description, an advantageous effect not mentioned would be clearly understandable by a person of ordinary skill in the art to which the present disclosure pertains.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
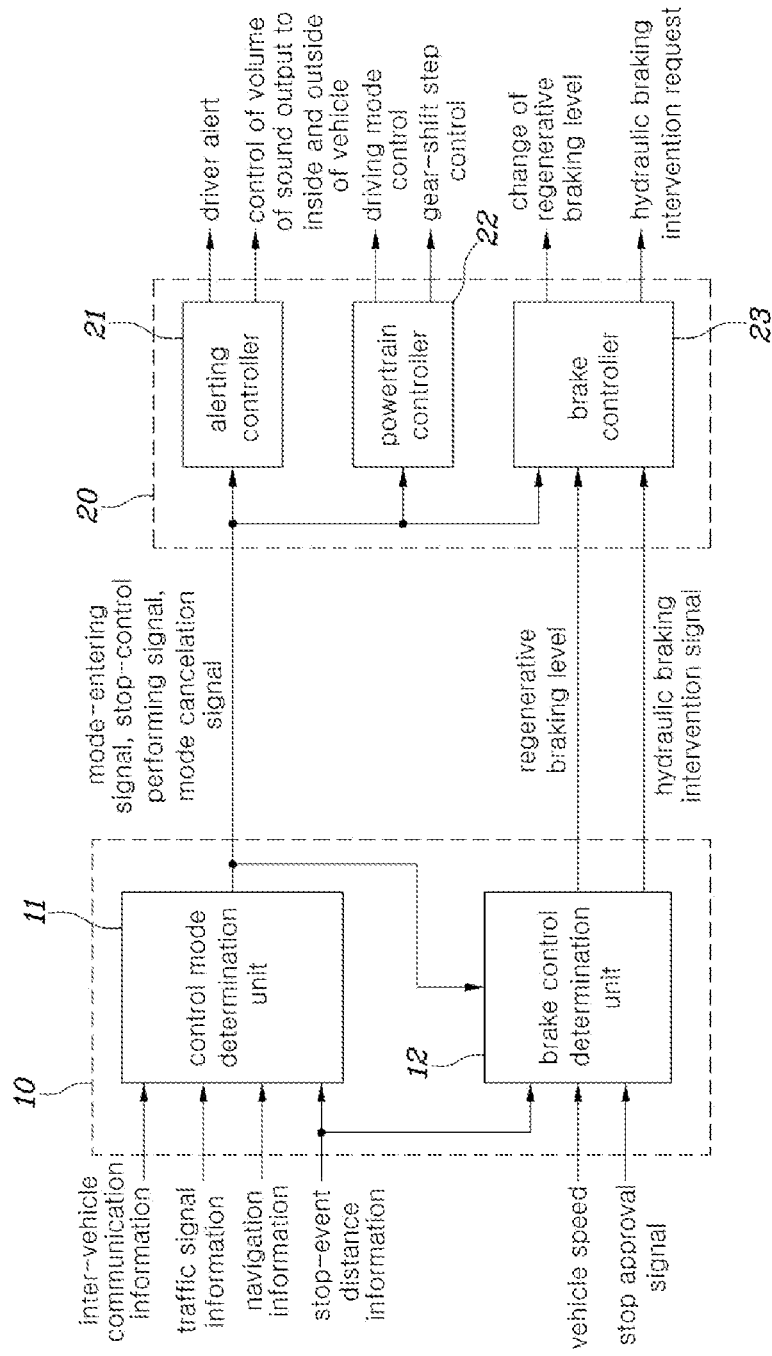
FIG. 1 is a block diagram illustrating an example of a configuration of an electrified vehicle according to a first embodiment of the present disclosure.

An embodiment of the present disclosure will be described below in detail with reference to the accompanying drawings. The same or similar constituent elements are given the same reference numeral, and descriptions thereof are not repeated.

In describing the embodiment of the present disclosure, a detailed description of a well-known technology related thereto will be omitted when determined as making the nature and gist of the present disclosure obfuscated. The accompanying drawings are used only to help easily understand the technical idea of the present disclosure. It should be understood that the idea of the present disclosure is not limited by the accompanying drawings and that any alterations of, equivalents of, and substitutes for, a constituent element of the present disclosure are included within the scope of the present disclosure.

The terms "first", "second", and so on are used to describe various constituent elements, but do not impose any limitation on various constituent elements. These terms are used only to distinguish one element from another.

A noun in singular form has the same meaning as when used in plural form, unless it has a different meaning in context.

The terms "include", "have", and the like in the present application are intended to indicate that a feature, a number, a step, an operation, a constituent element, a component, or a combination of these, which is described in the specification, is present, and thus should be understood not to preclude the possibility that one or more other features, numbers, steps, operations, constituent elements, components, or combinations of these will be present or added.

In addition, the terms unit and control unit that are used to name a constituent element in the present specification are the same as those widely used to name a controller that controls a specific function of a system and therefore do not mean a generic function unit. For example, the term "unit" and/or "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the controller.

There is proposed an electrified vehicle according to a first embodiment of the present disclosure that is capable of triggering a brake control mode for controlling a level of regenerative braking, whether or not hydraulic braking needs to intervene, and the like, without operating a paddle shift in a situation where the vehicle needs to come to a stop and to restart. The electrified vehicle can improve the operational convenience and safety of a driver. A structure for triggering the brake control mode is illustrated in FIG. 1.

FIG. 1 is a block diagram illustrating an example of a configuration of the electrified vehicle according to the first embodiment of the present disclosure that triggers the brake control mode.

With reference to FIG. 1, the electrified vehicle triggering the brake control mode may include a determination unit 10 and a controller 20. The determination unit 10 may include a control mode determination unit 11 and a brake control determination unit 12. The controller 20 may include an alerting controller 21, a powertrain controller 22, and a brake controller 23.

In the brake control mode according to the first embodiment, deceleration control, stop control, and acceleration control may be sequentially performed. The deceleration control may serve to raise the level of regenerative braking in a stepwise manner and to accordingly decelerate the vehicle. The stop control may serve to adjust the level of regenerative braking to the highest level and to determine according to the driver's input of a stop command whether or not the braking needs to intervene. In some embodiments, "braking" may refer to, for example, hydraulic braking. In other embodiments, "braking" may refer to, for example, engine braking. The acceleration control may serve to lower the level of regenerative braking in a stepwise manner and to accordingly accelerate the vehicle.

The control mode determination unit 11 may determine whether or not the brake control mode needs to be entered or be canceled and, in the brake control mode, may determine a point in time at which the stop control is performed.

First, on the basis of stop-event distance information, the control mode determination unit 11 may determine a remaining distance that the vehicle travels to a stop-event point and a distance that the vehicle travels from the stop-event point. According to the first embodiment, the stop-event point refers to a location at which the vehicle is required to stop according to a traffic signal system and a traffic situation. An example thereof may be a stop line in front of a crosswalk.

On the basis of traffic light information V2I, inter-vehicle communication information V2V, and navigation information, as well as the remaining distance from the vehicle to the stop-event point, the control mode determination unit 11 may determine whether or not in a situation where the vehicle needs to come to stop is reached, and thus may determine whether or not the brake control mode needs to be entered. When the brake control mode is entered, the control mode determination unit 11 may activate a mode-entering signal. A process in which the control mode determination unit 11 determines whether or not the brake control mode needs to be entered will be described in detail below with reference to FIG. 2.

Subsequently, when in the brake control mode, the remaining distance from the vehicle to the stop-event point is equal to or smaller than a preset stop distance, the control mode determination unit 11 may determine that the stop control needs to be performed and may activate a stop-control performing signal.

Lastly, when in the brake control mode, the distance of traveling of the vehicle from the stop-event point is equal to or greater than a preset cancelation distance, the control mode determination unit 11 may determine that the brake control mode needs to be canceled and may activate a mode cancelation signal.

On the basis of the mode-entering signal, the stop-control performing signal, and the mode cancelation signal, while the brake control mode is in operation, the brake control determination unit 12 may determine the level of regenerative braking and whether or not the hydraulic braking needs to intervene. The higher the level of regenerative braking, the more increased an amount of regenerative braking by an electric motor.

First, the brake control determination unit 12 may raise the level of regenerative braking in a stepwise manner on the basis of the remaining distance from the vehicle to the stop-event point and of the vehicle speed for a time period from when the mode-entering signal is activated to when the stop-control performing signal is activated (that is, from when the brake control mode is entered to when the remaining distance becomes the same as the preset stop distance) and may accordingly decelerate the vehicle. At this point, the smaller the remaining distance and the higher the vehicle speed, the more quickly the level of regenerative braking may be raised.

Subsequently, when the stop-control performing signal is activated, the brake control determination unit 12 may adjust the level of regenerative braking to the highest level and, on the basis of a stop approval signal in accordance with the driver's input of the stop command, may determine whether or not the hydraulic braking needs to intervene. When the stop control is performed in the brake control mode, the stop approval signal may be activated with the driver's voice, the driver's operation of a vehicle button, or the like.

More specifically, when the stop approval signal is activated in a situation where the stop control is performed, the brake control determination unit 12 may activate a hydraulic braking intervention signal according to the driver's input of the stop command. At this time, after coming to a complete stop with the intervention of the hydraulic braking, the electrified vehicle may restart with the driver's operation of an acceleration pedal.

When the stop approval signal is deactivated in the situation where the stop control is performed, the brake control determination unit 12 may determine that the driver does not input the stop command and may deactivate the hydraulic braking intervention signal. At this time, the electrified vehicle pass through the stop-event point without coming to a stop with the intervention of the hydraulic braking.

When the distance of traveling of the vehicle from the stop-event point is equal to or greater than a preset acceleration distance, the brake control determination unit 12 may lower the level of regenerative braking in a stepwise manner on the basis of the vehicle speed until the mode cancelation signal is activated (that is, for a time period from when the distance of traveling of the vehicle becomes the same as the preset acceleration distance to when the brake control mode is canceled) and may accordingly accelerate the vehicle. At this point, the lower the vehicle speed, the more quickly the level of regenerative braking is lowered.

The alerting controller 21 may transfer information on an in-operation state of the brake control mode to the driver on the basis of the mode-entering signal, the stop-control performing signal, and the mode cancelation signal. More specifically, the alerting controller 21 may output information on entering the brake control mode when the mode-entering signal is activated and may output information on canceling the brake control mode when the mode cancelation signal is activated. In addition, when the stop-control performing signal is activated, the alerting controller 21 may output the information on performing the stop control. Accordingly, in the brake control mode, the driver can recognize the performing of the stop control and can input the stop command through his/her voice, the operation of the vehicle button, or the like. Thus, the driver can control whether or not the hydraulic braking consistent with the stop approval signal needs to intervene.

In various practical examples, a technique in which the alerting controller 21 transfers the information on the in-operation state of the brake control mode to the driver may be employed in various ways. For example, the alerting controller 21 may output the information in a visual format by transmitting a pop-up message to a display provided in the electrified vehicle. Moreover, the alerting controller 21 may output the information in an audio format through a speaker provided in the electrified vehicle or using a pattern of vibration occurring by a vibrator provided therein.

While the brake control mode is in operation, on the basis of the mode-entering signal and the mode cancelation signal, the alerting controller 21 may decrease the volume of sound output to the inside of the vehicle from a vehicle audio system or the like mounted in the electrified vehicle in order to attract the driver's attention and may increase the volume of driving alert sound output to the outside of the vehicle for the safety of a pedestrian. At this point, when the electrified vehicle is in a creep driving state, the driving alert sound may correspond to sound that is artificially generated in such a manner as to alert the pedestrian that the electrified vehicle is in the creep driving state and may be realized by a virtual engine sound system (VESS) or the like.

On the basis of the mode-entering signal and the mode cancelation signal, the powertrain controller 22 may control a driving mode and a gear-shift step while the brake control mode is in operation. More specifically, when the electrified vehicle is a hybrid electric vehicle (HEV) or a plug-in hybrid electric vehicle (PHEV), while the brake control mode is in operation, the powertrain controller 22 may maintain the driving mode as an EV mode and may fix the gear-shift step in such a manner that vehicle braking is smoothly performed. The EV mode here refers to the driving mode in which the HEV or the PHEV is driven with only a drive force of the electric motor without using a drive force of an engine.

Based on the mode-entering signal and the mode cancelation signal, the brake controller 23 may change the level of regenerative braking to the level of regenerative braking that is determined by the brake control determination unit 12 while the brake control mode is in operation. When the hydraulic braking intervention signal is activated, the brake controller 23 may make a request to a hydraulic braking apparatus for the intervention of the hydraulic braking.

Figure 2:
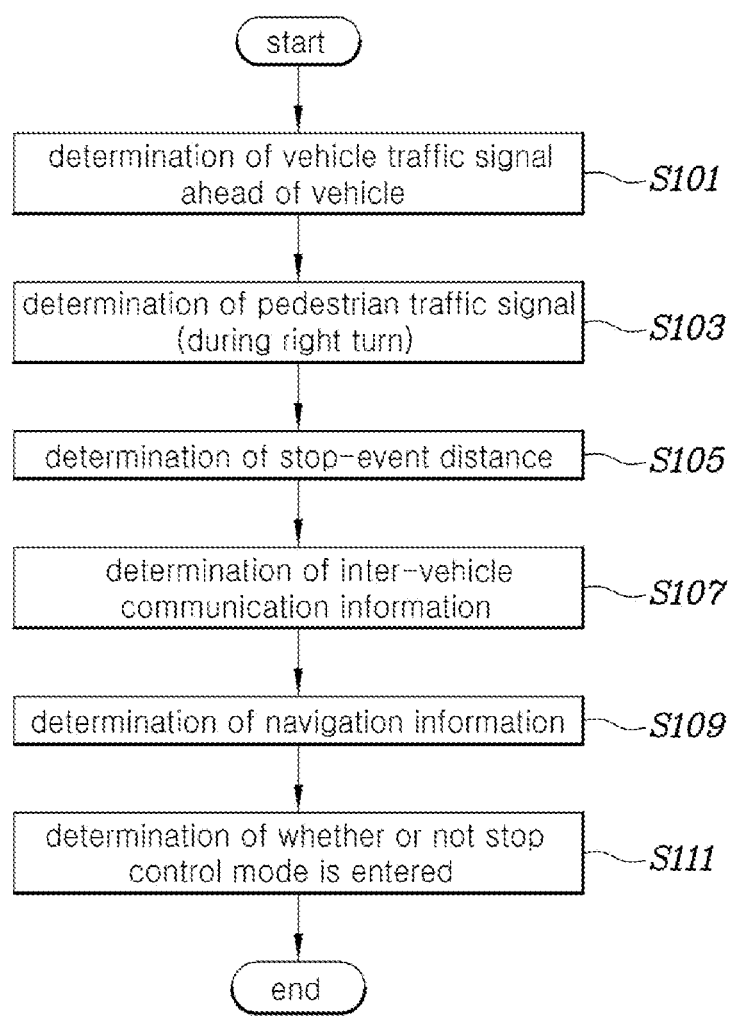
FIG. 2 is a flowchart that is referred to for description of a process in which the electrified vehicle according to the first embodiment of the present disclosure determines whether or not a brake control mode needs to be entered.

FIG. 2 is a flowchart that is referred to for description of a process in which the control mode determination unit 11 illustrated in FIG. 1 determines whether or not the brake control mode needs to be entered.

The control mode determination unit 11 may compute a value in accordance with light from a vehicle traffic light ahead of the vehicle on the basis of the traffic light information (S101). For example, the values consistent with the light from the vehicle traffic light ahead of the vehicle may be computed as "0", "1" and "2" for green, yellow, and red, respectively.

The control mode determination unit 11 may compute values in accordance with light from a pedestrian traffic light ahead of the vehicle and light from a pedestrian traffic light to the right side of the vehicle on the basis of the traffic light information during a right turn (S103). For example, the value in accordance with the light from the pedestrian traffic light may be computed as "0" when the pedestrian traffic light ahead of the vehicle and the pedestrian traffic light to the right side of the vehicle are both red, as "1" when the pedestrian traffic light ahead of the vehicle and the pedestrian traffic light to the right side of the vehicle are red and green, respectively, and as "2" when the pedestrian traffic light ahead of the vehicle and the pedestrian traffic light to the right side of the vehicle are both green.

The control mode determination unit 11 may compute a value in accordance with the remaining distance from the vehicle to the stop-event point on the basis of the stop-event distance information (S105). For example, the value in accordance with the remaining distance may be computed as "0" "when the remaining distance exceeds 60 m", as "1" "when the remaining distance is equal to smaller than 60 m and exceeds 30 m", and as "2" "when the remaining distance is equal to or smaller than 30 m".

In a situation where the vehicle travels toward crossroads where the traffic light is not installed, the control mode determination unit 11 may compute a value in accordance with the presence or absence of a vehicle near a crossroads on the basis of the inter-vehicle communication information (S107). For example, the value in accordance with the present or absence of a vehicle may be computed as "0" "when a vehicle is absent near a crossroads", as "1" "when a vehicle approaches a crossroads", and as "2" "when a vehicle comes to a stop at a crossroads".

The control mode determination unit 11 may compute a value in accordance with the occurrence or non-occurrence of a deceleration event and the stop event on the basis of the navigation information (S109). For example, the value in accordance with the occurrence or non-occurrence of the event may be computed as "0" "when the deceleration event and the stop event does not occur", as "1" "when the stop event occurs", and as "2" "when the deceleration occurs".

The control mode determination unit 111 adds up the values computed in S101, S103, S105, S107, and S109. When the sum of the values exceeds a reference value, the control mode determination unit 111 may determine that the situation where the vehicle needs to come to a stop is reached and may determine that the brake control mode needs to be entered (S111).

Figure 3:
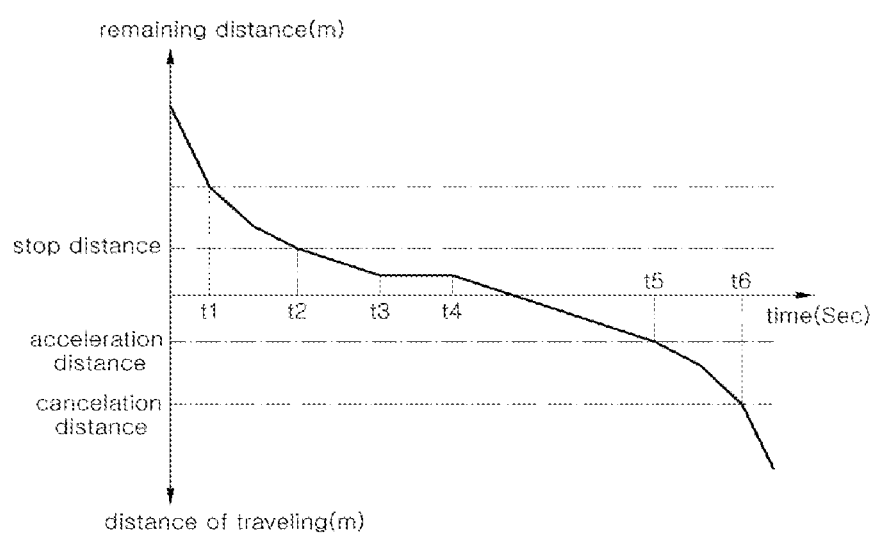
FIG. 3 is a graph that is referred to for description of the brake control mode that is triggered in the electrified vehicle according to the first embodiment of the present disclosure.

FIG. 3 is a graph that is referred to for description of the brake control mode that is triggered in the electrified vehicle according to the first embodiment of the present disclosure.

At t1, on the basis of the remaining distance from the vehicle to the stop-event point, the traffic light information, the inter-vehicle communication information, and the navigation information, the control mode determination unit 11 may determine that the brake control mode needs to be entered. At this time, the brake control determination unit 12 may raise the level of regenerative braking in a stepwise manner and accordingly may decelerate the vehicle.

At t2, when the remaining distance from the vehicle to the stop-event point is equal to or smaller than the preset stop distance, the control mode determination unit 11 may determine that the stop control needs to be performed. At this time, the brake control determination unit 12 may adjust the level of the regenerative braking to the highest level.

At t3, when the stop approval signal in accordance with the driver's input of the stop command is activated, in order for the vehicle to come to a complete stop, the brake control determination unit 12 may determine that the hydraulic braking needs to intervene.

At t4, when the acceleration pedal is operated according to the driver's intention of accelerating the vehicle, the electrified vehicle that comes to a stop may restart.

At t5, when the distance of traveling of the vehicle from the stop-event point is equal to or greater than the preset acceleration distance, the brake control determination unit 12 may lower the level of regenerative braking in a stepwise manner and accordingly may accelerate the vehicle.

At t6, when the distance of traveling of the vehicle from the stop-event point is equal to or greater than the preset cancelation distance, the control mode determination unit 11 may determine that the brake control mode needs to be canceled.

Figure 4:
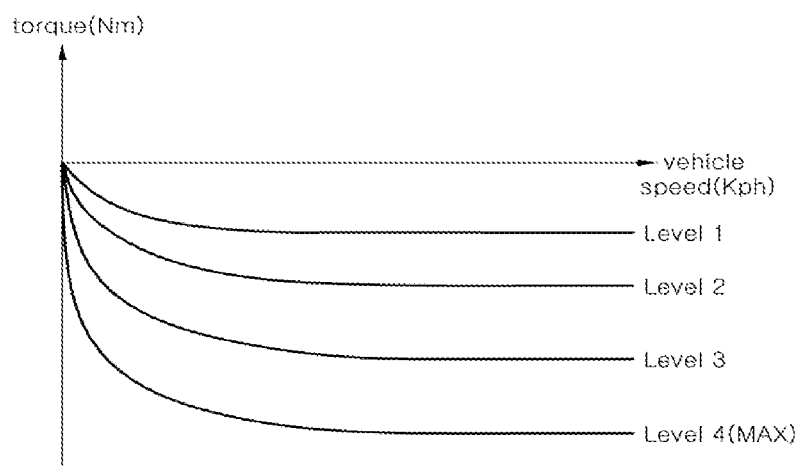
FIG. 4 is a graph that is referred to for description of a change in an amount of regenerative braking in accordance with a level of regenerative braking in the electrified vehicle according to the first embodiment of the present disclosure.

FIG. 4 is a graph that is referred to for description of a change in the amount of regenerative braking in accordance with the level of regenerative braking in the electrified vehicle according to the first embodiment of the present disclosure.

With reference to FIG. 4, the levels of regenerative braking may include Level 1, Level 2, Level 3, and Level 4, and Level 4 may be defined as the highest level of the levels of regenerative braking. The higher the level of regenerative braking, the more increased reverse torque to be applied to the electric motor. The more increased the reverse to be applied to the electric motor, the more increased the amount of regenerative braking by the electric motor. In addition, when the vehicle speed is above a predetermined level, the amount of regenerative braking by the electric motor may have a predetermined value.

Figure 5:
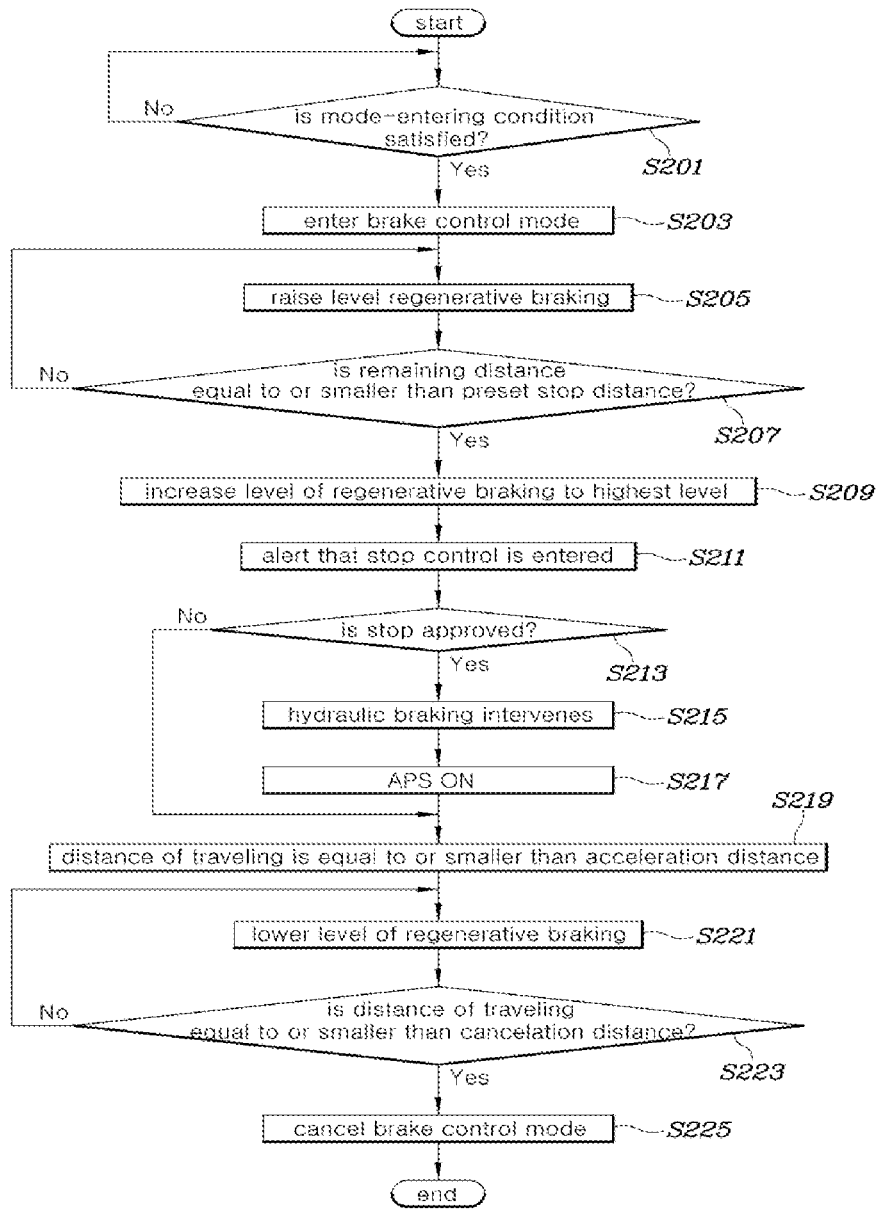
FIG. 5 is a flowchart that is referred to for description of a method of controlling an electrified vehicle according to a second embodiment of the present disclosure.

FIG. 5 is a flowchart that is referred to for description of a method of controlling driving of the electrified vehicle according to a second embodiment of the present disclosure.

With reference to FIG. 5, on the basis of the traffic light information, the inter-vehicle communication information, the navigation information, and the remaining distance from the vehicle to the stop-event point, the control mode determination unit 11 may determine whether or not the vehicle needs to come to a stop is reached and may determine whether or not the brake control mode needs to be entered (S201). When a mode-entering condition is not satisfied (NO in S201), the control mode determination unit 11 may reperform S201.

When the mode-entering condition is satisfied (YES in S201), the powertrain controller 22 may maintain the driving mode as the EV mode and may fix the gear-shift step. In addition, the alerting controller 21 may transfer to the driver the information on entering the brake control mode. Moreover, the alerting controller 21 may decrease the volume of sound output to the inside of the vehicle and may increase the volume of driving alert sound output to the outside of the vehicle (S203).

Subsequently, the brake control determination unit 12 may raise the level of regenerative braking on the basis of the remaining distance from the vehicle to the stop-event point and the vehicle speed and accordingly may decelerate the vehicle (S205).

In order to determine whether or not the stop control needs to be performed, the control mode determination unit 11 may determine whether or not the remaining distance from the vehicle to the stop-event point is equal to or smaller than the preset stop distance (S207). When the remaining distance exceeds the preset stop distance (NO in S207), the brake control determination unit 12 may raise the level of regenerative braking back (S205). That is, the brake control determination unit 12 may raise the level of regenerative braking in a stepwise manner for a time period from when the brake control mode is entered to when the remaining distance becomes the same as the stop distance.

When the remaining distance is equal to or smaller than the preset stop distance (YES in S207), the brake control determination unit 12 may adjust the level of regenerative braking to the highest level (S209). Subsequently, the alerting controller 21 may transfer to the driver to the information on performing the stop control (S211). On the basis of the input of the stop command by the driver who recognizes the information on performing the stop control, it may be determined whether or not the stop approval signal needs to be activated (S213).

When the stop approval signal is activated according to the driver's input of the stop command (YES in S213), the brake control determination unit 12 may determine that the hydraulic braking needs to intervene, in such a manner that the vehicle comes to a complete stop (S215). Subsequently, the electrified vehicle may restart with the driver's operation of the acceleration pedal, and thus the distance of traveling of the vehicle from the stop-event point may become the same as the preset acceleration distance (S219). When the stop approval signal is deactivated (NO in S213), the electrified vehicle may pass through the stop-event point without coming to a stop with the intervention of the hydraulic braking, and the distance of traveling of the vehicle from the stop-event point may become the same as the preset acceleration distance (S219).

When the distance of traveling of the vehicle from the event-event point is equal to or greater than the preset acceleration distance, the brake control determination unit 12 may lower the level of regenerative braking on the basis of the vehicle speed and accordingly may accelerate the vehicle (S221).

In order to determine whether or not the brake control mode needs to be canceled, the control mode determination unit 11 may determine whether or not the distance of traveling of the vehicle from the stop-event point is equal to or greater than the preset cancelation distance (S223). When the distance of traveling of the vehicle is smaller than the preset cancelation distance (NO in S223), the brake control determination unit 12 may lower the level of regenerative braking back (S221). That is, the brake control determination unit 12 may lower the level of regenerative braking in a stepwise manner for a time period from when the distance of traveling of the vehicle becomes the same as the preset acceleration distance to when the brake control mode is canceled.

When the distance of traveling of the vehicle from the stop-event point is equal to or greater than the preset cancelation distance (YES in S223), the control mode determination unit 11 may determine that the brake control mode needs to be canceled (S225). At this time, the alerting controller 21 may transfer to the drive the information on canceling the brake control mode and may restore the volume of sound output to the inside of the vehicle and the volume of drive alert sound output to the outside of the vehicle to original states thereof, respectively. In addition, the powertrain controller 22 may interrupt an operation of maintaining the driving mode as the EV mode and an operation of fixing the gear-shift step.

The method according to the second embodiment of the present disclosure may be realized by being stored as computer-readable codes on a program-recorded medium. The computer-readable media include all types of recording devices in which to store data that are readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Therefore, the detailed description should be considered as exemplary one without being interpreted in a limited manner in all aspects. The scope of the present disclosure is determined by legitimate construction of the following claims. All equivalent modifications to the embodiments of the present disclosure fall within the scope of the present disclosure.

What is claimed is:

1. A method of controlling driving of an electrified vehicle, the method comprising:
   increasing a level of regenerative braking on the basis of a remaining distance measured from a vehicle to a stop-event point when a brake control mode is entered;
   determining whether or not to perform braking on the basis of a stop approval signal when the remaining distance is equal to or less than a preset first distance in the brake control mode; and
   decreasing the level of regenerative braking when a distance of traveling of the vehicle measured from the stop-event point is equal to or greater than a preset second distance in the brake control mode.

2. The method of claim 1, further comprising:
   determining whether or not the brake control mode will be entered on the basis of: the remaining distance, traffic light information, navigation information, and inter-vehicle communication information.

3. The method of claim 1, further comprising:
   maintaining a driving mode as an EV mode and fixing a gear-shift step when the brake control mode is entered.

4. The method of claim 1, further comprising:
   outputting, when the brake control mode is entered, information on entering the brake control mode;
   decreasing a volume level of a sound output directed inside of the vehicle; and
   increasing a volume level of a driving alert sound output directed outside of the vehicle.

5. The method of claim 1, wherein in the increasing of the level of regenerative braking step, the level of regenerative braking is increased in a stepwise manner on the basis of a vehicle speed and the remaining distance for a time period measured from (a) when the brake control mode is entered to (b) when the remaining distance is equal to the preset first distance.

6. The method of claim 1, further comprising:
   adjusting the level of regenerative braking to a highest level when the remaining distance is equal to or less than the preset first distance.

7. The method of claim 1, wherein the determining of whether or not to perform the braking step further comprises:
   outputting information on performing stop control when the remaining distance is equal to or less than the preset first distance in the brake control mode;
   activating the stop approval signal on the basis of a predetermined command input; and causing hydraulic braking, the hydraulic braking being performed when the stop approval signal is activated.

8. The method of claim 1, further comprising:
canceling the brake control mode when the distance of traveling of the vehicle is equal to or greater than a preset third distance.

9. The method of claim 8, wherein in the decreasing of the level of regenerative braking step, the level of regenerative braking is lowered in a stepwise manner on the basis of a vehicle speed for a time period measured from (a) when the distance of traveling of the vehicle is equal to the preset second distance to (b) when the brake control mode is canceled.

10. A non-transitory computer-readable recording medium having computer executable code stored thereon that, when executed, is configured to perform the method of controlling driving of an electrified vehicle according to claim 1.

11. An apparatus for an electrified vehicle, comprising:
a control mode determination unit configured to:
determine whether or not to enter a brake control mode on the basis of a remaining distance measured from a vehicle to a stop-event point, and
determine whether or not to enter stop control when the remaining distance is equal to or less than a preset first distance in the brake control mode; and
a brake control determination unit configured to:
increase a level of regenerative braking when the brake control mode is entered,
determine whether or not to perform braking on the basis of a stop approval signal when the stop control is entered, and
decrease the level of regenerative braking when a distance of traveling of the vehicle measured from the stop-event point is equal to or greater than a preset second distance.

12. The apparatus of claim 11, wherein the control mode determination unit is further configured to determine whether or not the brake control mode is entered on the basis of: the remaining distance, traffic light information, navigation information, and inter-vehicle communication information.

13. The apparatus of claim 11, further comprising:
a powertrain controller configured to maintain a driving mode as an electric vehicle (EV) mode and fix a gear-shift step when the brake control mode is entered.

14. The apparatus of claim 11, further comprising:
an alerting controller configured to:
output information corresponding to the brake control mode when the brake control mode is entered,
decrease a volume level of a sound output directed inside of the vehicle, and
increase a volume level of a driving alert sound output directed outside of the vehicle.

15. The apparatus of claim 11, wherein the brake control determination unit is further configured to increase the level of regenerative braking in a stepwise manner on the basis of a vehicle speed and the remaining distance for a time period measured from (a) when the brake control mode is entered to (b) when the remaining distance is equal to the preset first distance.

16. The apparatus of claim 11, wherein the brake control determination unit is further configured to adjust the level of regenerative braking to a highest level when the stop control is performed.

17. The apparatus of claim 11, wherein the brake control determination unit is further configured to determine to enter the brake control mode when the stop approval signal is activated on the basis of a predetermined command input.

18. The apparatus of claim 11, wherein the control mode determination unit is further configured to determine that the brake control mode needs to be canceled when the distance of traveling of the vehicle is equal to or greater than a preset third distance.

19. The apparatus of claim 18, wherein the brake control determination unit is further configured to decrease the level of regenerative braking in a stepwise manner on the basis of a vehicle speed for a time period measured from (a) when the distance of traveling of the vehicle is equal to the preset second distance to (b) when the brake control mode is canceled.

20. The apparatus of claim 11, further comprising the vehicle.

* * * * *